UNITED STATES PATENT OFFICE.

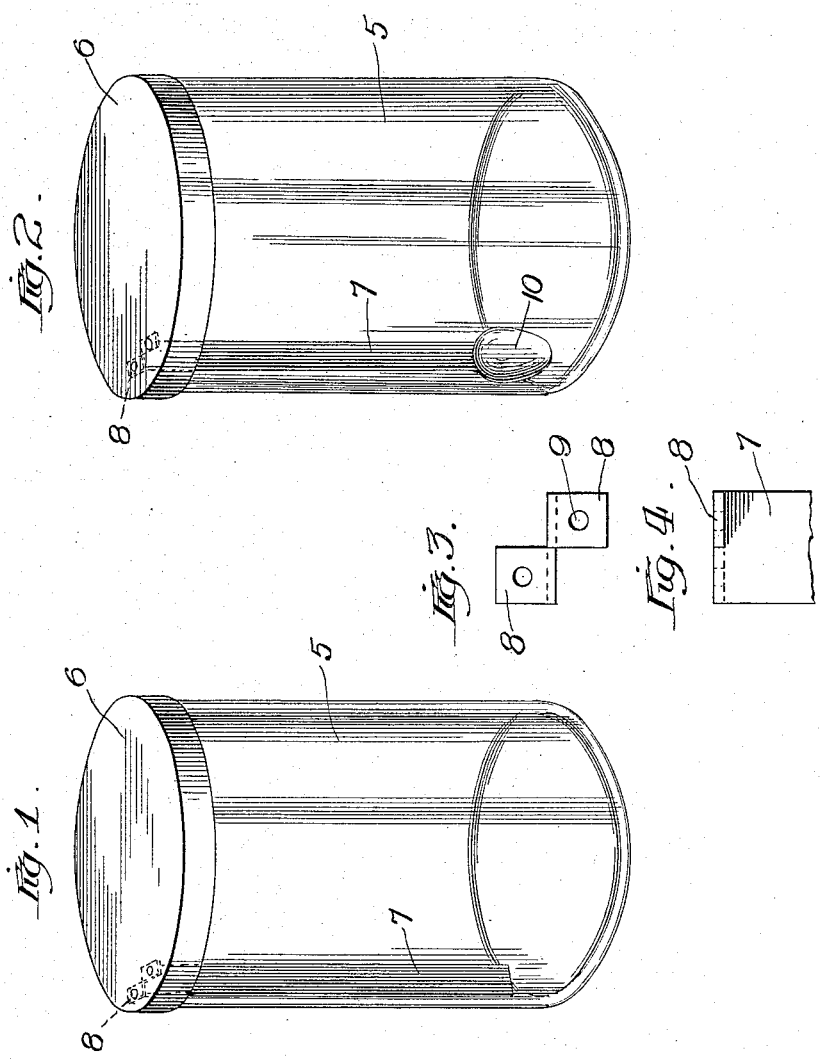

HENRY T. SIDWAY, OF GODFREY, ILLINOIS.

JAR-CAP.

1,174,628.  Specification of Letters Patent.  Patented Mar. 7, 1916.

Application filed July 8, 1915. Serial No. 38,826.

*To all whom it may concern:*

Be it known that I, HENRY T. SIDWAY, a citizen of the United States, residing at the city of Godfrey, in the county of Madison and State of Illinois, have invented certain new and useful Improvements in Jar-Caps, of which the following is a specification.

This invention relates generally to caps or covers for jars, bottles, cans, or other receptacles, and is particularly concerned with a construction having means to scrape and dish out the contents of the receptacle.

Among the objects of my invention, I have sought to provide a jar cover answering to the usual requirements, and which is equipped with means for enabling removal of contents with facility, and in quantities as desired; and which is simple, inexpensive, and durable in use.

Other objects and uses of my invention will more fully hereinafter appear.

In the drawing: Figure 1 is a perspective view of a glass jar, showing a cover constructed in accordance with my invention; Fig. 2 is a view similar to that of Fig. 1, showing a cover having a modified form of paddle attached thereto; Fig. 3 is a plan view of the paddle shown detached from the cover; and Fig. 4 is a side elevation of the upper end of the paddle shown detached from the cover.

In carrying into effect the present invention, I employ an ordinary receptacle 5, such, for instance, as the glass jar shown in Figs. 1 and 2, together with a suitable cover or cap 6 therefor. Attached to the under side of the cover and extending downwardly into the jar, preferably in proximity to the walls thereof, is a paddle 7. To enable the paddle to be attached to the underside of the cover, the upper end of the paddle is bent to form one or more wings 8 which may take the form shown in Fig. 3. Each of the wings 8 may have one or more holes 9 through which a rivet or similar connector may be passed to join the paddle to the jar cover, or, if desired, other connecting means may be used instead. In the construction shown in Fig. 2, the lowermost end of the paddle is shaped to provide a bowl 10, similar to that of an ordinary tea-spoon.

A cover embodying my invention may be removed from the jar in such a way that a portion of the contents will adhere to the paddle. In cases where the contents are of a sticky and greasy nature, such, for instance, as axle grease, the paddle 6 will serve as a blade or instrument with which to apply the material. In this way, there is no loss of contents, since the cover with paddle attached will be replaced in covering position upon the receptacle, and such of the material as still adheres to the paddle is preserved, available for further use. When attached near the periphery of the cover, the paddle may be made to lie in proximity to the inner walls of the receptacle. If a cylindrical form of receptacle be used, such as is shown in Figs. 1 and 2, the cover may be rotated, whereupon the paddle is caused to travel around adjacent the inner surface of the receptacle, to dislodge, remove, or cut away the material which might otherwise tend to cake, stick, or adhere within the receptacle. In this manner the paddle may be used as a scraper to facilitate removal of the contents.

Where the lower end of the paddle is formed in the manner shown in Fig. 2, the bowl 10 may be so shaped as to hold a predetermined quantity of material, corresponding, for instance, to the capacity of a tea-spoon, whereby the employment of a separate measuring implement is rendered unnecessary to ascertain the quantity of material being removed from the receptacle.

In use it is manifest that the cover serves as a handle for the paddle, and for this purpose may be so designed as to readily accommodate itself to the hand.

I claim:

1. In a receptacle having an opening on one side thereof, the combination of a flanged cover arranged to overlie the open side of the receptacle, with the flanged portion of the cover in engagement with the edges of the opening in the receptacle, and a paddle fixedly secured to the inner side of the cover adjacent to one edge thereof, and arranged to project into the receptacle in proximity to one of the walls thereof when the cover is operatively positioned upon the receptacle, and arranged to be withdrawn from the receptacle when the cover is removed therefrom, substantially as described.

2. In a receptacle having an opening on one side thereof, the combination of a flanged cover arranged to overlie the open side of the receptacle, with the flanged portion of the cover in engagement with the exterior walls of the receptacle, and a paddle fixedly secured to the inner side of the cover at or near the edge thereof, and arranged to project into the receptacle in proximity to one of the walls thereof when the cover is operatively positioned upon the receptacle, and arranged to be withdrawn from the receptacle when the cover is removed therefrom, substantially as described.

3. In a receptacle having an opening on one side thereof, the combination of a flanged cover arranged to overlie the open side of the receptacle, with the flanged portion of the cover in engagement with the exterior walls of the receptacle, and a paddle fixedly secured to the inner side of the cover at or near the edge thereof, and arranged to project into the receptacle in proximity to the walls thereof when the cover is operatively positioned upon the receptacle, the end of the paddle projected into the receptacle being shaped to hold a measured quantity of material, substantially as described.

HENRY T. SIDWAY.

Witnesses:
Jos. O. Balcar,
J. W. Martin.

Copies of this patent may be obtained for five cents each, by addressing the "Commissioner of Patents, Washington, D. C."